United States Patent
Majocka et al.

(10) Patent No.: US 9,290,925 B2
(45) Date of Patent: Mar. 22, 2016

(54) FLOOR DRAIN STABILIZER RING

(75) Inventors: Christopher A. Majocka, Erie, PA (US); David Gomo, Waterford, PA (US); Doug Wroblewski, Wattsburg, PA (US)

(73) Assignee: Zurn Industries, LLC, Milwaukee, WI (US)

( * ) Notice: Subject to any disclaimer, the term of this patent is extended or adjusted under 35 U.S.C. 154(b) by 255 days.

(21) Appl. No.: 11/784,199

(22) Filed: Apr. 5, 2007

(65) Prior Publication Data

US 2007/0236003 A1 Oct. 11, 2007

Related U.S. Application Data

(60) Provisional application No. 60/790,164, filed on Apr. 7, 2006.

(51) Int. Cl.
*F16L 55/00* (2006.01)
*E03F 5/04* (2006.01)

(52) U.S. Cl.
CPC ....... *E03F 5/0407* (2013.01); *E03F 2005/0413* (2013.01); *E03F 2005/0414* (2013.01)

(58) Field of Classification Search
USPC ............ 4/679, 695, 252.1–252.4; 285/56, 58, 285/24, 410, 411, 412, 413, 415; 137/362
See application file for complete search history.

(56) References Cited

U.S. PATENT DOCUMENTS

| | | | |
|---|---|---|---|
| 412,195 A | 10/1889 | Marker | |
| 645,749 A * | 3/1900 | Kasschau | ........................... 4/287 |
| 984,259 A | 2/1911 | Beck | |
| 1,560,731 A * | 11/1925 | Reynolds | ..................... 431/222 |
| 1,613,926 A | 1/1927 | Bropson | |
| 1,650,057 A | 11/1927 | Wernle | |
| 1,686,498 A | 10/1928 | Parker | |
| 1,779,936 A | 10/1930 | Hess | |
| 1,792,345 A | 2/1931 | Williams | |
| 1,988,669 A | 1/1935 | Sommerfeld | |
| 2,121,220 A | 6/1938 | Filkins | |
| 2,121,984 A | 6/1938 | Rieger et al. | |
| 2,221,803 A * | 11/1940 | Krobusek | ..................... 137/798 |
| 2,837,750 A * | 6/1958 | Robinson | ..................... 4/252.5 |
| 2,994,433 A | 8/1961 | Sandin | |
| 3,089,654 A * | 5/1963 | Voudy | .............................. 4/652 |
| 3,096,527 A * | 7/1963 | Eynon | .............................. 4/287 |
| 3,104,400 A * | 9/1963 | Lantz et al. | ..................... 4/287 |

(Continued)

OTHER PUBLICATIONS

Specification Sheet for a deck drain (Z-415B) dated Jul. 15, 2004, manufactured by Zurn Industries.

(Continued)

*Primary Examiner* — Aaron Dunwoody
(74) *Attorney, Agent, or Firm* — Quarles & Brady LLP

(57) ABSTRACT

A stabilizing collar which is adapted to fasten to a drain pipe for stabilizing a drain. The stabilizing collar in the form of a ring includes an opening between an inner surface for receipt of a pipe and defines an engagement member for securing the body to the pipe and a support receiving member adapted to receive a support member for supporting the drain on the stabilizing collar. The present invention further provides for a method of installing the stabilizing collar to stabilize a receptacle body of the drain. The receptacle body is attached to the pipe and the support members are adjusted so that they contact the receptacle body and therefore provide support to keep the receptacle body at the same slope as the floor level.

23 Claims, 4 Drawing Sheets

(56) References Cited

U.S. PATENT DOCUMENTS

| | | | |
|---|---|---|---|
| 3,246,582 A | 4/1966 | Wade et al. | |
| 3,327,326 A * | 6/1967 | Friedman | 4/286 |
| 3,529,723 A | 9/1970 | Hagedorn | |
| 3,680,153 A | 8/1972 | Haldopoulos et al. | |
| 3,711,874 A * | 1/1973 | Gajer | 4/287 |
| 4,207,632 A | 6/1980 | Savell, Jr. et al. | |
| 4,423,527 A | 1/1984 | Morris et al. | |
| 4,492,391 A * | 1/1985 | Haines | 285/114 |
| 4,505,814 A | 3/1985 | Marshall | |
| 4,574,402 A | 3/1986 | Brown, Sr. | |
| 4,850,617 A | 7/1989 | Moberly | |
| 4,883,590 A * | 11/1989 | Papp | 210/164 |
| 4,964,180 A | 10/1990 | Harbeke | |
| 5,154,024 A * | 10/1992 | Noel | 52/12 |
| 5,190,320 A * | 3/1993 | Hodges | 285/56 |
| 5,470,172 A | 11/1995 | Wiedrich | |
| 5,628,484 A * | 5/1997 | Lechuga | 248/149 |
| 5,695,222 A | 12/1997 | Hodges | |
| 5,878,448 A * | 3/1999 | Molter | 4/613 |
| 6,192,532 B1 | 2/2001 | Sesser et al. | |
| 6,269,495 B1 | 8/2001 | Sondrup | |
| 6,319,397 B1 | 11/2001 | Su et al. | |
| 6,350,373 B1 | 2/2002 | Sondrup | |
| 6,381,775 B1 | 5/2002 | Sondrup | |
| 6,443,495 B1 | 9/2002 | Harmeling | |
| 6,537,446 B1 | 3/2003 | Sanguinetti | |
| 6,594,966 B2 | 7/2003 | Froeter | |
| 6,595,721 B2 | 7/2003 | Kincheloe | |
| 6,647,682 B2 | 11/2003 | Bishop | |
| 6,766,545 B2 * | 7/2004 | Hodges | 4/679 |
| 2003/0037498 A1 | 2/2003 | Bishop | |
| 2003/0159978 A1 | 8/2003 | Self et al. | |
| 2004/0136785 A1 | 7/2004 | Gunter | |
| 2005/0166315 A1 * | 8/2005 | Warnecke et al. | 4/695 |
| 2006/0013649 A1 | 1/2006 | Humphries et al. | |
| 2008/0028515 A1 | 2/2008 | Miller | |
| 2008/0168727 A1 | 7/2008 | Ledford et al. | |

OTHER PUBLICATIONS

Product Sheet for the Zurn Z415B-SR Type B Strainer and Stabilizer Ring, dated Apr. 26, 2006.

Installation instructions for assembling the Zurn Z400-SR Floor Drain Stabilizer Ring, dated Apr. 4, 2006.

* cited by examiner

FLOOR DRAIN STABILIZER RING

CROSS REFERENCE TO RELATED APPLICATION

This application is based on U.S. Provisional Patent Application No. 60/790,164, filed Apr. 7, 2006, on which priority of this patent application is based and which provisional patent application is hereby incorporated by reference in its entirety.

BACKGROUND OF THE INVENTION

1. Field of the Invention

The present invention relates generally to the installation of plumbing fixtures, and more particularly, to a method, apparatus and assembly for installing floor drains.

2. Description of Related Art

Unlike other types of plumbing fixtures, floor drains install directly into a concrete floor. Once installed, the rim of the fixture lies flush with the upper surface of the floor. In that position, liquid at floor level flows directly into the fixture and through an outlet at the bottom of the drain pipe beneath the floor. Such fixtures find widespread use and many floor drains appear in the concrete floors of buildings. Some of these buildings are many stories high and have many drains throughout.

Frequently, in multi-level buildings, the drain pipes extend through the incomplete skeleton structure. There is no floor to attach a stabilizing structure to make a drain "at grade". The prior art stabilizing structure couples with the pipe and requires a floor for support for the pipe to further support the drain. In another application, after placing a sleeve over each drain pipe, the installer carefully fills the sleeves with sand to prevent collapse during the process of pouring the concrete floor. Once the sand is covering the drain pipe at each installation location, then workers can pour concrete and finish it at a predetermined floor level. The prior art installations involved time-consuming steps and is not possible in some situations. Therefore, a new and more efficient, less costly and less time-consuming way to install fixtures, such as floor drains, is sought.

SUMMARY OF THE INVENTION

The present invention provides for a stabilizing collar which is adapted to fasten to a drain pipe for stabilizing a drain. The stabilizing collar includes a body having an outer surface and an inner surface. The inner surface of the body defines an opening for receipt of a pipe. The body defines an engagement member attached for securing the body to a pipe. The body further defines a support receiving portion adapted to receive a support member for supporting a drain on the stabilizing collar. The body may comprise a ring. Alternatively, the body may comprise segment. The support receiving portion may define a support receiving member which is integral with the body. The support receiving member may be in the form of a lug or boss, further defining a passageway therethrough. The support boss may include an engagement member to engage a support member. Alternatively, the support receiving member may further includes a threaded portion to coact with a threaded support member or it may not be threaded, in which case, a threaded ledge can hold a support member.

The body of the stabilizing collar may be a ring. An engagement member can be provided further including an adjustment member to contact a pipe. Alternatively, the stabilizing collar may define a segment having an adjustable diameter. A hinge may divide the segment and separate the stabilizing collar into two separate segments where the hinge attaches the two segments together. An engagement member may be present to adjustably press the two segment ends together, thereby adjusting the diameter. The stabilizing collar can further include a support member to coact with the support receiving members.

The support receiving members can be threaded support receiving members to receive threaded support members. Alternatively, a threaded support member can be received in a support receiving member where the support member is threadedly received by a threaded ledge. The threaded ledge can be a threadably adjusted nut that sits upon the support receiving member. In the alternative, the support receiving member can be sandwiched between two threadedly adjustable members threadedly attached to the support member. The inner surface of the stabilizing collar can define the pattern for providing a frictional connection between the stabilizing collar and the drain pipe. The stabilizing collar can be made of cast metal or plastic.

The present invention also provides for a stabilizing assembly for stabilizing a floor drain to a pipe. The stabilizing assembly includes a stabilizing collar and a receptacle body. The stabilizing collar, as discussed previously, has a body which has an outer surface and an inner surface defining an opening for adjusting the stabilizing collar to fit a pipe. The body further includes support receiving members for securing a support member for supporting the drain. Support members are received by the support receiving members and are attached to the body of the stabilizing collar and extend longitudinally from the stabilizing collar providing support for the receptacle body. The stabilizing assembly can further include a pipe, the opening in the body of the stabilizing collar adapted to secure to the pipe.

The present invention provides for a method of installing a stabilizing collar to stabilize a receptacle body of a drain. The method includes first providing a drain, the receptacle body thereof having a first end and a second end as in the previously discussed stabilizing collar assembly. Next, a stabilizing collar is coupled to a drain pipe. Then a support member is coupled to the stabilizing collar using one of several methods, such as an adjustment member received in an engagement member attached using a nut or threadable support members for coacting with threaded support receiving members. Next the receptacle body is attached to the pipe, leveled and the support members are adjusted so that at least one contacts the receptacle body and therefore provides support to keep the receptacle body at the same slope as the floor level. A further step includes concrete being poured onto the floor foundation while the stabilizing collar stabilizes the floor drain, thereby covering the stabilizing collar with the concrete.

In addition, in a further step, a desired slope for a receptacle body is attained by adjusting the receptacle body to have a slope in accordance with the slope of a floor and the support members can be adjusted longitudinally to position the underside of the receptacle body causing the top of the receptacle body to attain a slope in conjunction with a floor level.

DESCRIPTION OF THE PREFERRED EMBODIMENTS

Figure 1:
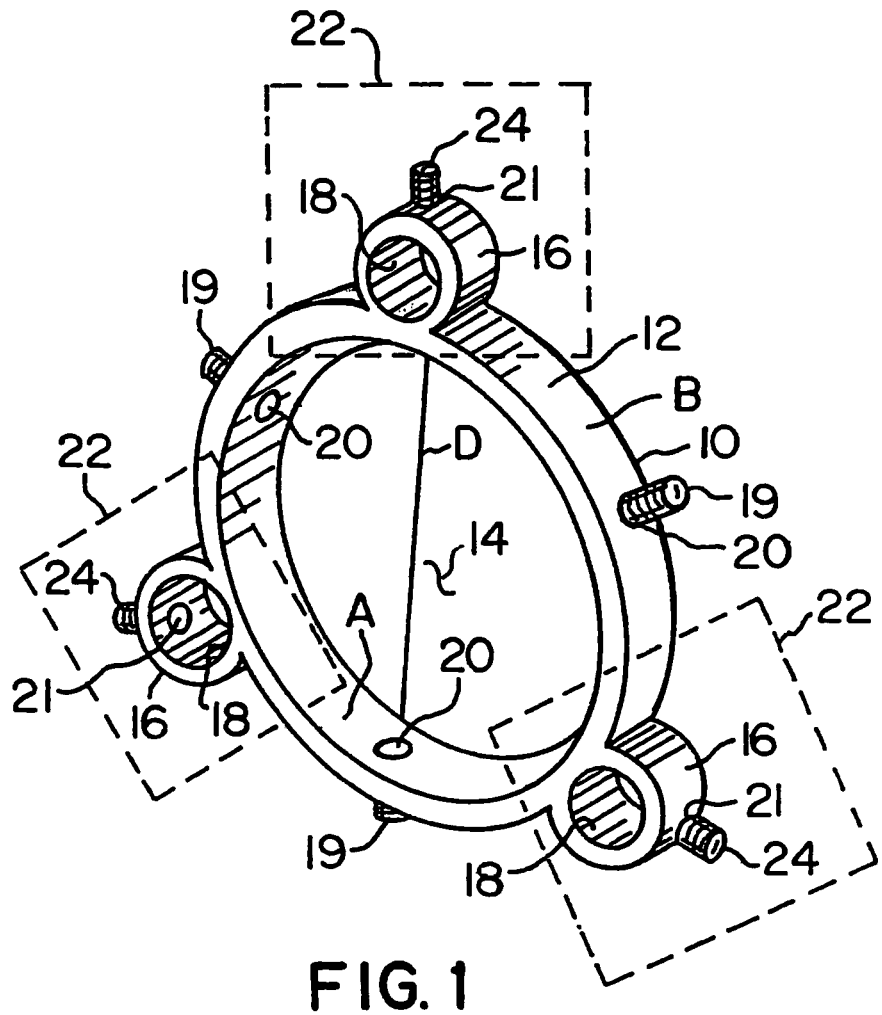
FIG. 1 is a top perspective view of a stabilizing collar made in accordance with the present invention.
Figure 2:
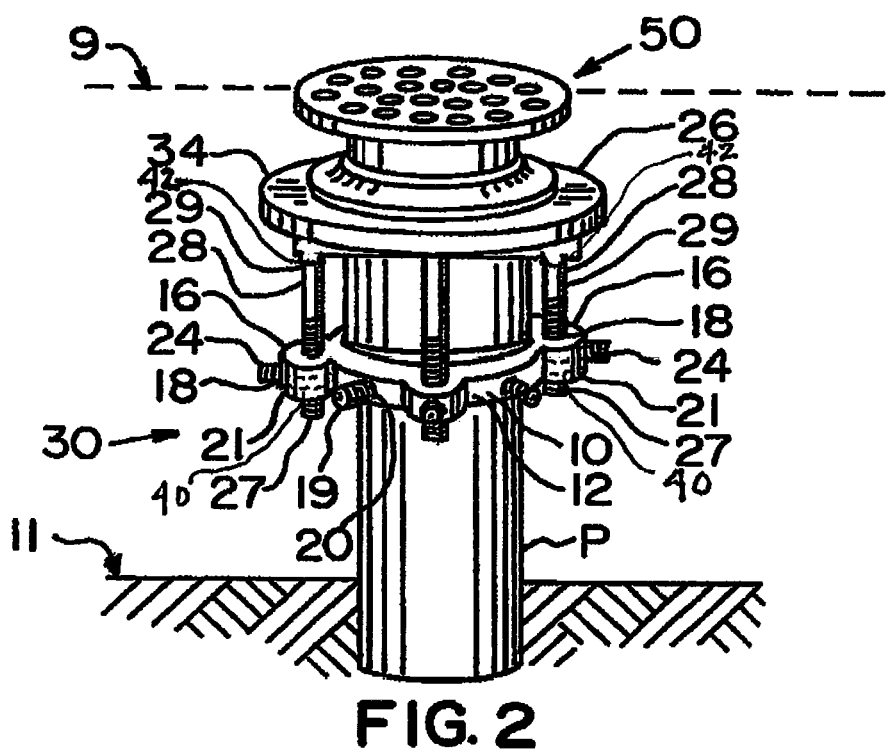
FIG. 2 is a perspective view of a drain assembly including a drain pipe and a receptacle body in accordance with the present invention.

Referring to FIGS. 1 and 2, the present invention is a stabilizing collar 10 used to support a receptacle body 26 of a prior art floor drain. The stabilizing collar 10 includes a ring-shaped body 12 having an inner surface A and an outer surface B. The inner surface A of the stabilizing collar 10 of the body 12 defines an opening 14 having a diameter D. The body 12 of the stabilizing collar 10 defines threaded holes 20 acting as engagement members, a plurality of which, are spaced radially along the outer surface B of body 12, which receive threaded fasteners 19 acting as adjustment members, preferably screws or set screws. In this case, three threaded holes 20 are provided spaced 120° apart. The body 12 of the stabilizing collar 10 further defines support receiving portions 22 (shown in phantom), which include a plurality of axially opened bosses 16 acting as engagement members, integral to body 12 and spaced apart radially along the outer surface B of body 12 of the stabilizing collar 10. In this case, three bosses 16 are provided, spaced 120° apart. The bosses 16 and the threaded holes 20 are circumferentially offset from each other. The axially opened bosses 16 define a passageway 18. The axially opened bosses 16 further define threaded holes 21, engagement members which receive threaded fasteners 24, preferably screws or set screws acting as adjustment members, which adjust into the axially opened bosses 16 in order to contact support members 28, which are received by passageways 18, thereby securing support members 28 of stabilizing collar 10. In another embodiment, the axially opened bosses can define threaded passageways 40, as shown in FIG. 2, for threadably receiving, attaching and securing threaded support members. With further reference to FIG. 1, the stabilizing collar 10 can be made of plastic or cast iron.

FIG. 2 shows a floor drain support assembly 30 that includes a receptacle body 26 of a drain 50 coupled to a support collar 10 coupled to support members 28 and pipe P. The drain can include a first portion located at or above a floor surface, and a second portion located below the floor surface, and wherein the drain pipe extends below the floor surface. Pipe P can be made of any material including, but not limited to, cast iron pipe, steel pipe, plastic pipe, extra heavy soil pipe and service weight pipe. The stabilizing collar 10 which has a diameter D greater than a diameter of pipe P is attached to a portion of the pipe P extending below the floor surface when a threaded fastener 19 (such as a screw or a set screw), received by threaded holes 20 and threadably adjusted into threaded holes 20 until it contacts the outer surface of pipe P thereby securing stabilizing collar 10 to pipe P. Receptacle body 26 has a bottom end 34, which is attached to pipe P. Support members 28 having a first end 27 are secured to the stabilizing collar 10 via the passageways 18 of the axially opened bosses 16. Support members 28 can be made from threaded rod or rebar.

With continuing reference to FIG. 2, the first end 27 of support members 28 are received by passageways 18 of axially opened bosses 16 and the threaded fasteners 24 are adjusted into the engagement members 21 to contact and secure the support members 28. Alternatively, support members may have threadedly adjustable first ends for coacting with threaded passageways of support receiving members and can be threadedly attached. The second end 29 of support members 28 are placed in contact with receptacle body 26 of drain 50. Receptacle body 26 can have downwardly opening bosses 42, as shown in FIG. 2, for contacting the second end 29 of the support members 28. The support drain body 26 can be, for example, a Zurn Z415-B drain. As shown in FIG. 2, axially opened bosses 16 are integral to the body 12 of stabilizing collar 10. After the support members 28 are attached to the stabilizing collar 10 which is attached to pipe P and the receptacle body 26 is placed onto the second end 29 of support members 28, concrete can be poured around drain 50 to a floor level 9 covering the floor drain support assembly 30 to the level of a floor foundation 11. Typically, the floor drain pipe assembly extends above ground level or at grade. A portion of the drain 50 can be encased in concrete. The stabilizing collar 10 acts to stabilize drain 50 during the installation process.

Figure 3:
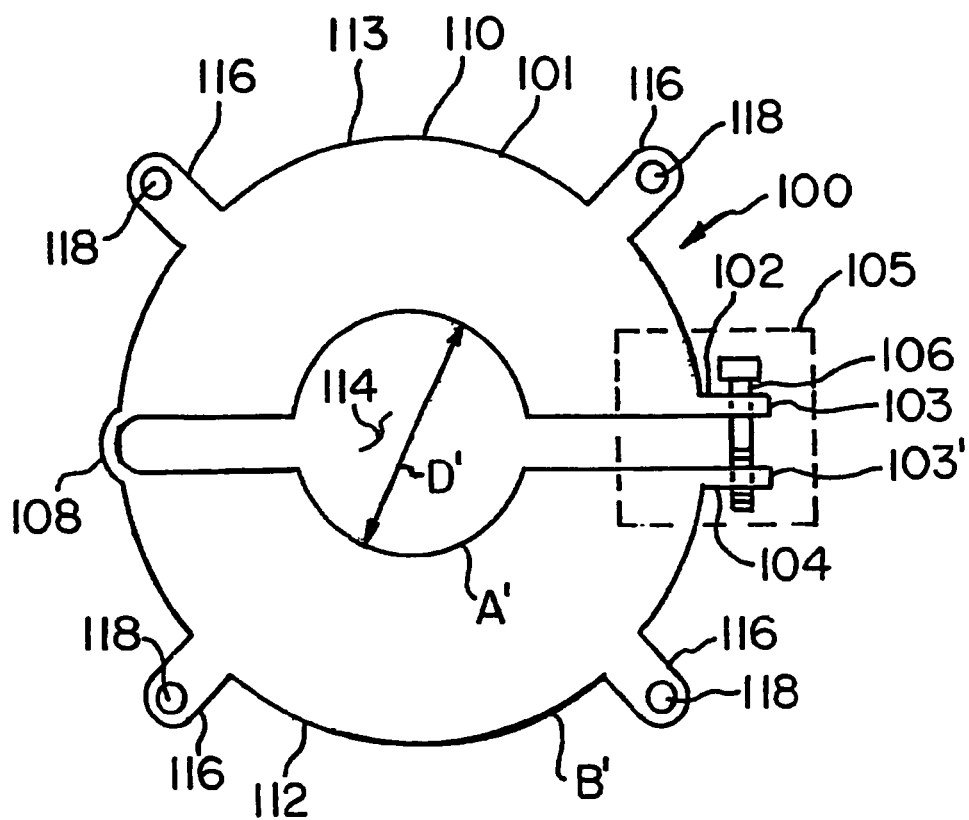
FIG. 3 is a top perspective view of another embodiment of a stabilizing collar made in accordance with the present invention.
Figure 4:
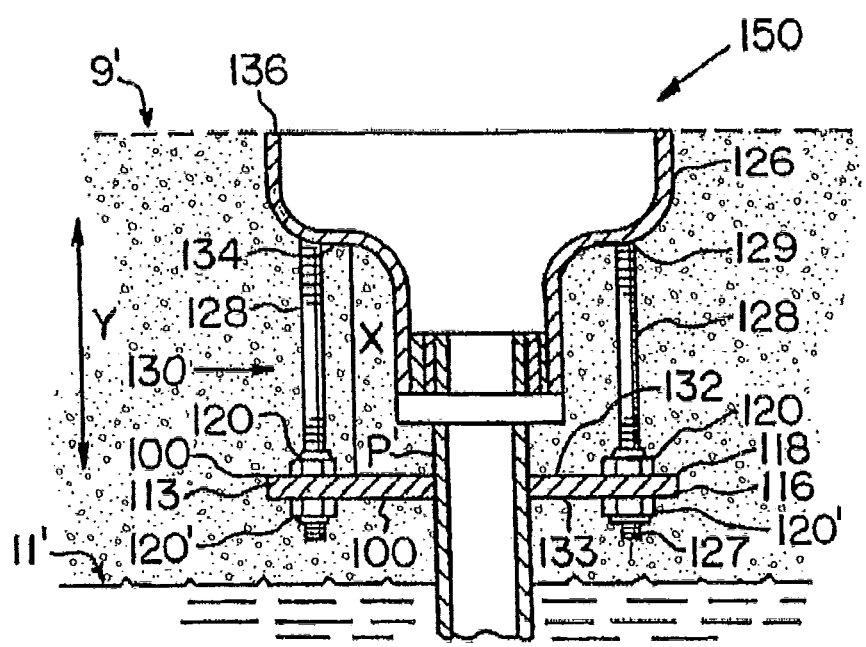
FIG. 4 is a side elevational view, partly in section of the installed stabilizing collar of FIG. 3.

FIGS. 3 and 4 show a second apparatus having an inner surface A' and an outer surface B'. A stabilizing collar 100 includes a body 113 in the form of an arcuate segment 101. The arcuate segment 101 can be divided into a first arcuate segment 110 and a second arcuate segment 112 with a hinge 108 positioned therebetween. Inner surface A' of body 113 defines an opening 114 having a diameter D'. An engagement member 105 can include a passageway 103 and 103' (shown in phantom) through a first end 102 of first arcuate segment 110 and a first end 104 of second arcuate segment 112, respectively, for receiving a threaded fastener 106 acting as an adjustment member. The threaded fastener 106, preferably a screw or set screw, is adjusted to change the diameter D' of the body 113 of stabilizing collar 100 to attach to a pipe P'. The body 113 of the stabilizing collar 100 defines lugs acting as support receiving members 116. As shown in FIGS. 3 and 4, lugs 116 having a passageway 118. The inner surface A' defines a pattern to provide frictional support between the body 113 of the stabilizing collar 100 and the pipe P'.

FIGS. 3 and 4 further show a second floor drain support assembly 130 having a drain receptacle body 126 having a top end 136 and a bottom end 134 and a stabilizing collar 100 (not shown to scale). The stabilizing collar 100, as previously discussed, has an engagement member 105 for adapting stabilizing collar 100 to attach to pipe P'. A support member 128 having a threaded first end 127 is received by passageway 118 of support receiving member 116. The support member 128 is threaded and attached to the body 113 of stabilizing collar 100 after first end 127 is passed through support receiving member 116 by attaching a nut 120 positioned adjacent a top surface 132 of body 113 forming a threaded ledge. A washer (not shown) can be further positioned between the nut 120 and the body 113. A second nut 120' can be positioned adjacent a bottom surface 133 of body 113 sandwiching the support receiving member 116 between first nut 120 and second nut 120'. The distance X between the receptacle body 126 can be adjusted by moving nuts 120 and 120' longitudinally along the threaded support member 128. The bottom end 134 of receptacle body 126 is resting on the support members 128.

Stabilizing collar 100 is fastened to pipe P' when the engagement member 105 is adjusted to secure stabilizing collar 100 to the pipe P' by screwing the threaded fastener 106, which is preferably a threaded thumbscrew until the first end 102 at first segment 110 abuts first end 104 of second segment 112 and diameter D' of stabilizing collar 100 is adapted to secure to a diameter of pipe P'. The pipe P' can also be a part of the second floor drain support assembly 130. Floor drain receptacle body 126 is also adapted to attach to a pipe P'. Typically, the floor drain pipe assembly extends above ground level or at grade. A portion of the second floor drain support assembly 130 can be encased in concrete. The stabilizing collar 100 acts to stabilize the second floor drain support assembly 130 during the installation process.

The present invention provides a method for stabilizing a floor drain to a pipe P'. The receptacle body 126 is provided having a first end 136 and a second end 134. A stabilizing collar 100 is provided, the stabilizing collar 100 having the features as discussed previously. The opening 114 of the stabilizing collar 100 is placed over pipe P' and engagement member 105 is adjusted to attach the stabilizing collar 100 to pipe P'. Next, the support members 128 are coupled to the stabilizing collar 100.

The support members 128 of the body 113 of stabilizing collar 100 are coupled to the support receiving members 116 when passed through the passageways 118. For attachment as shown in FIG. 4 to occur, a first adjustable member 120, preferably a nut, is fastened to the support member 128 and a first end 127 of the support member 128 is received within the passageway 118 and the passageway 118 of the body apparatus 113. The support member 128 passes through the passageway 118 and support receiving member 116 wherein the first adjustable member 120 abuts against the top surface 132 of the body 113 of the stabilizing collar 100. A distance X between the receptacle body 126 and the stabilizing collar 100 can be increased or decreased by longitudinally moving the first adjustable member 120 in either direction, represented by arrow Y along the support member 128. Once the distance X is determined, a second adjustable member 120' is fastened onto the support member 128 at the first end 127 and moved toward the bottom surface 133 of the body 113 of the stabilizing collar 100, thereby fixing the distance X between the receptacle body 126 and the stabilizing collar 100. The distance X can still be adjusted by longitudinally moving both adjustable members 120, 120' along the support member 128.

Alternatively, as shown in FIG. 2, the support members 28 are received by passageways 18 of axially opened bosses 16 and secured with fastener members 24, which are received into engagement members 21 and adjusted until the support members 28 are contacted by the fastener members 24.

In FIG. 4, once the support members 128 are attached to the stabilizing collar 100, the bottom end 134 of drain receptacle body 126 is attached to pipe P'. Next, the receptacle body 126 is leveled. Then, the support members are longitudinally adjusted, as previously described, until they contact bottom end 134 of receptacle body 126, thereby stabilizing the receptacle body 126 in its level position. The receptacle body 126 can have a boss for contacting a support member 128. The receptacle body 126 is rotated until contact occurs between at least one support member 128 and the receptacle body boss. The receptacle body 126 is checked to determine it is still leveled after the prior adjustments, if not it can be leveled again as many times as necessary. Each time the receptacle body 126 is leveled, the steps including adjustment of the support members 128 and rotating the receptacle body 126 to contact the support members 128 are repeated.

Once the receptacle body 126 is level and stabilized by the support members 128, a concrete mixture can be poured around the floor drain assembly 130 covering the floor foundation 11' until a floor level 9' has been reached.

In addition to providing stabilization, the present invention provides for a support member to slope the receptacle body 126. Sloping can take place by adjusting the support members 128 once they have been attached to the stabilizing collar 100. The top surface 136 of receptacle body 126 is sloped to match a floor level 9', then support members 128 are longitudinally adjusted to contact the bottom end 134 of receptacle body 126 in the sloped position so that it rests upon the support members 128 in such a way as to slope the top end surface 136 of the receptacle body 126. The top end surface 136 having a slope that matches the slope of floor level 9'.

Similarly, the floor drain support assembly 30 in FIG. 2 can be leveled or sloped, depending on the adjustment of the support members 28. Once the receptacle body 26 is attached to the pipe P, the top surface 36 of receptacle body 26 is sloped to match floor level 9. Alternatively, the top surface 36 of receptacle body 26 is leveled. Then support members 28 are longitudinally adjusted to contact the bottom end 34 of the receptacle body 26. Leveling the receptacle body 26, adjusting the support members 28 and rotating the receptacle body 26 can be repeated.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A stabilized drain and pipe assembly comprising:
a pipe received by a drain, the drain having a receptacle body, the receptacle body having a first end located at or above a floor surface and a second end located below the floor surface, the second end of the receptacle body adapted to fasten to the pipe at a location below the floor surface;
a stabilizing collar having a single piece circular body portion having an outer surface and an inner surface defining an opening configured for receipt of the pipe, an engagement member associated with the body of the stabilizing collar and adapted to secure the body of the stabilizing collar on the pipe, said engagement member configured for cooperation with at least one adjustment member, said adjustment member being adjustable with respect to a diameter of the pipe such that said adjustment member contacts said pipe to secure the collar onto the pipe, and a support receiving portion adapted to receive a support member to support the drain on the collar wherein the stabilizing collar is secured to the pipe via the engagement member and the adjustment member, wherein the adjustment member is in direct contact with the pipe; and
at least one support member for stabilizing the receptacle body relative to the stabilizing collar, the support member having a first end and a second end, said first end configured for cooperation with the support receiving portion of the stabilizing collar at a location beneath the floor surface, said at least one support member longitudinally extending from the stabilizing collar such that said second end engages the second end of the receptacle body of the drain.

2. The assembly as recited in claim 1, wherein:
the opening of the stabilizing collar is configured for receiving said pipe and wherein the stabilizing collar can be secured to the pipe.

3. The assembly of claim 1, wherein the engagement member comprises a plurality of openings spaced apart radially along the outer surface of the body and the at least one adjustment member comprises a plurality of set screws cooperating with the openings.

4. The assembly of claim 3, wherein the plurality of set screws are adjustably movable within said plurality of openings into contact with the pipe to secure the stabilizing collar to the pipe.

5. The assembly of claim 3, wherein the plurality of openings includes three threaded holes spaced radially along the outer surface of the body approximately 120° apart and wherein the assembly further includes three bosses integral to the body and spaced approximately 120° apart.

6. The assembly of claim 5, wherein the threaded holes and the bosses are circumferentially offset from one another.

7. The assembly of claim 1, wherein the drain is configured to receive a perforated drain cover.

8. The assembly of claim 1, wherein the collar and pipe are subsequently embedded in concrete.

9. The assembly of claim 1, wherein the support receiving portion comprises a plurality of bosses spaced apart radially along the outer surface of the body and wherein each of the bosses includes an engagement member and an adjustment member to engage said support member with the boss.

10. The assembly of claim 1, wherein the stabilizing collar is made of cast metal or plastic.

11. The assembly of claim 1, wherein the second end of the receptacle body of the drain includes at least one boss having an opening and the second end of the at least one support member is configured for contacting the at least one boss.

12. The assembly of claim 1, wherein the support receiving portion comprises a plurality of threaded passageways and wherein the first end of each of the support members is threaded for coacting with the threaded passageways of the support receiving portion.

13. A stabilized drain and pipe assembly comprising:
a pipe received by a drain, the drain having a receptacle body, the receptacle body having a first end located at or above a floor surface and a second end located below the floor surface, the second end of the receptacle body adapted to fasten to the pipe at a location below the floor surface;
a stabilizing collar having a body having an outer surface and an inner surface defining an opening configured for receipt of the pipe and an engagement member associated with the body of the stabilizing collar and adapted to secure the body of the stabilizing collar on the pipe, said engagement member configured for cooperation with at least one adjustment member, said adjustment member being adjustable with respect to a diameter of the pipe such that said adjustment member contacts said pipe to secure the collar onto the pipe wherein the stabilizing collar is secured to the pipe via the engagement member and the adjustment member, wherein the adjustment member is in direct contact with the pipe;
a plurality of bosses spaced apart radially along the outer surface of the stabilizing collar;
a plurality of support members, each of said support members having a first end and a second end, said first end configured for cooperating with said boss, and said second end being coupled to the second end of the receptacle body of the drain.

14. The assembly of claim 13, wherein the stabilizing collar comprises a single piece circular body portion.

15. The assembly of claim 13, wherein the second end of the receptacle body of the drain includes a plurality of bosses which are different than the plurality of bosses spaced along the outer surface of the stabilizing collar, each of the bosses on the second end of the receptacle body of the drain having an opening and the second end of each of said support members is configured for contacting a corresponding boss on the second end of the receptacle body of the drain.

16. A stabilized drain and pipe assembly comprising:
a pipe received by a drain, the drain having a receptacle body, the receptacle body having a first end located at or above a floor surface and a second end located below the floor surface, the second end of the receptacle body having a portion including at least one boss having an opening and a portion adapted to fasten to the pipe at a location below the floor surface;
a stabilizing collar having a body having an outer surface and an inner surface defining an opening for receiving the pipe, an engagement member associated with the body of the stabilizing collar, said engagement member configured for cooperation with at least one adjustment member for securing the body of the stabilizing collar on the pipe such that said adjustment member contacts said pipe to secure the collar onto the pipe, said adjustment member being adjustable with respect to a diameter of the pipe, and a support receiving portion for receiving a support member to support the drain on the collar wherein the stabilizing collar is secured to the pipe via the engagement member and the adjustment member, wherein the adjustment member is in direct contact with the pipe; and
at least one support member for stabilizing the receptacle body relative to the stabilizing collar, the support member having a first end and a second end, said first end cooperating with the support receiving portion of the stabilizing collar at a location beneath the floor surface, said at least one support member longitudinally extending from the stabilizing collar such that said second end is configured for contacting the at least one boss of the drain.

17. The assembly of claim 16, wherein the engagement member comprises a plurality of openings spaced apart radially along the outer surface of the body and the at least one adjustment member comprises a plurality of set screws cooperating with the openings.

18. The assembly of claim 17, wherein the plurality of set screws are adjustably movable within said plurality of openings into contact with the pipe to secure the stabilizing collar to the pipe.

19. The assembly of claim 16, wherein the support receiving portion comprises a plurality of bosses spaced apart radially along the outer surface of the body.

20. The assembly of claim 19, wherein each of the bosses includes an engagement member and an adjustment member to engage said support member with the boss.

21. The assembly of claim 16, wherein the stabilizing collar comprises a single piece circular body portion.

22. The assembly of claim 16, wherein the support members are adjustable to adjust a slope of the receptacle body.

23. The assembly of claim 22, wherein the support members are longitudinally adjustable to adjust a top surface of the receptacle body to a slope matching a floor level.

* * * * *